Jan. 14, 1930.     I. PATRICK     1,743,476
FLUID ACTUATED CONTROL FOR CLUTCHES
Filed Oct. 5, 1928     6 Sheets-Sheet 2

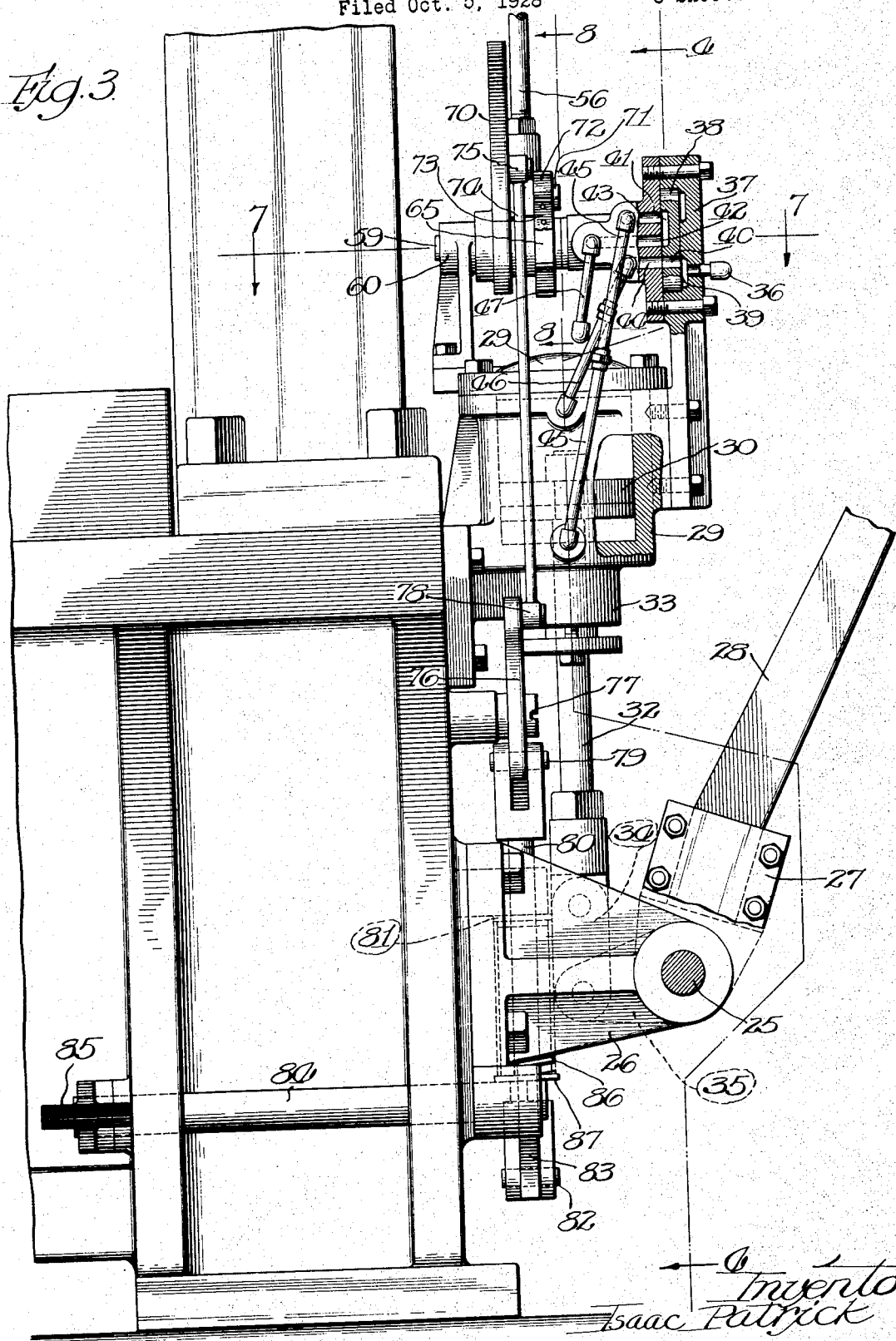

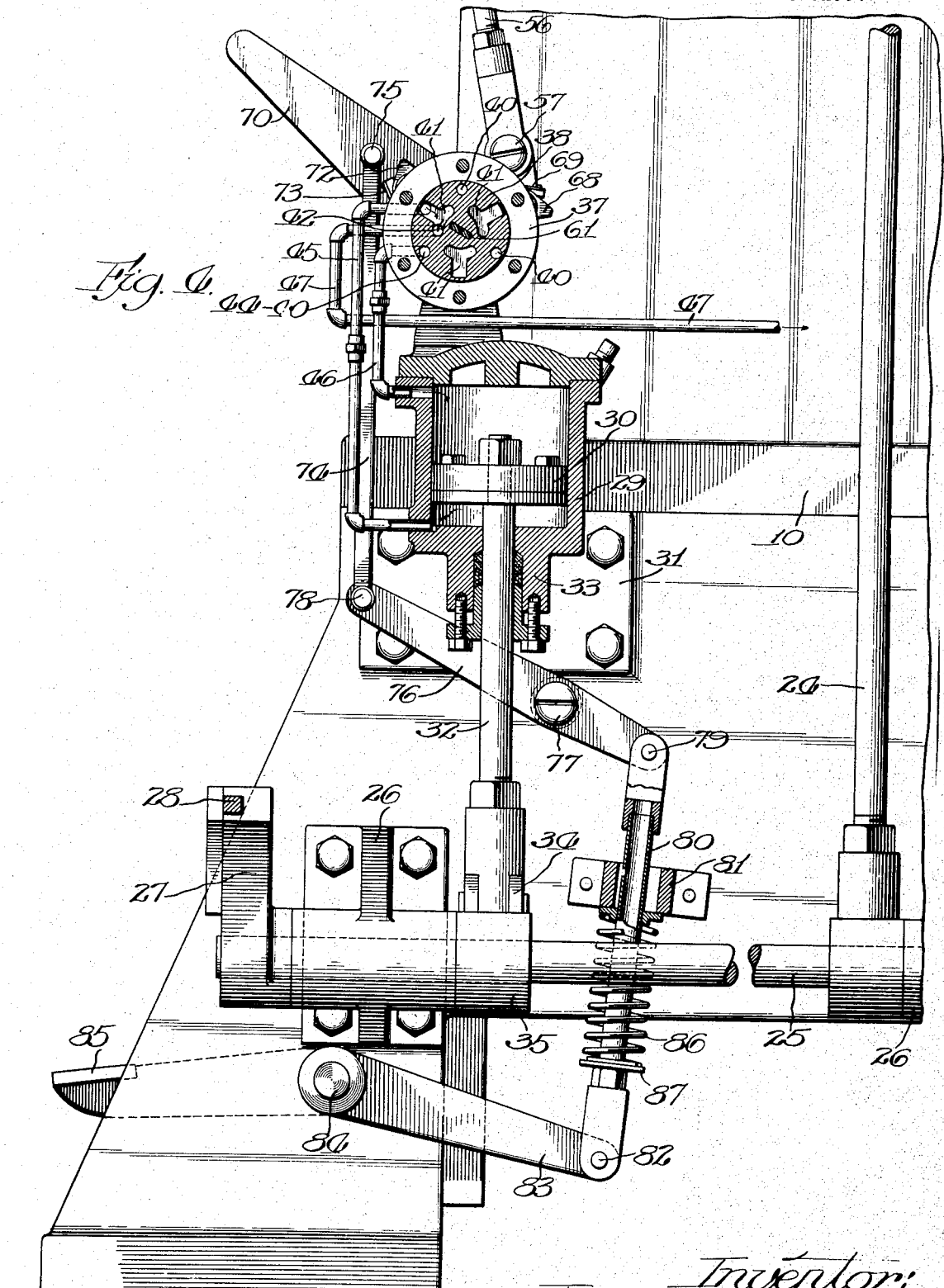

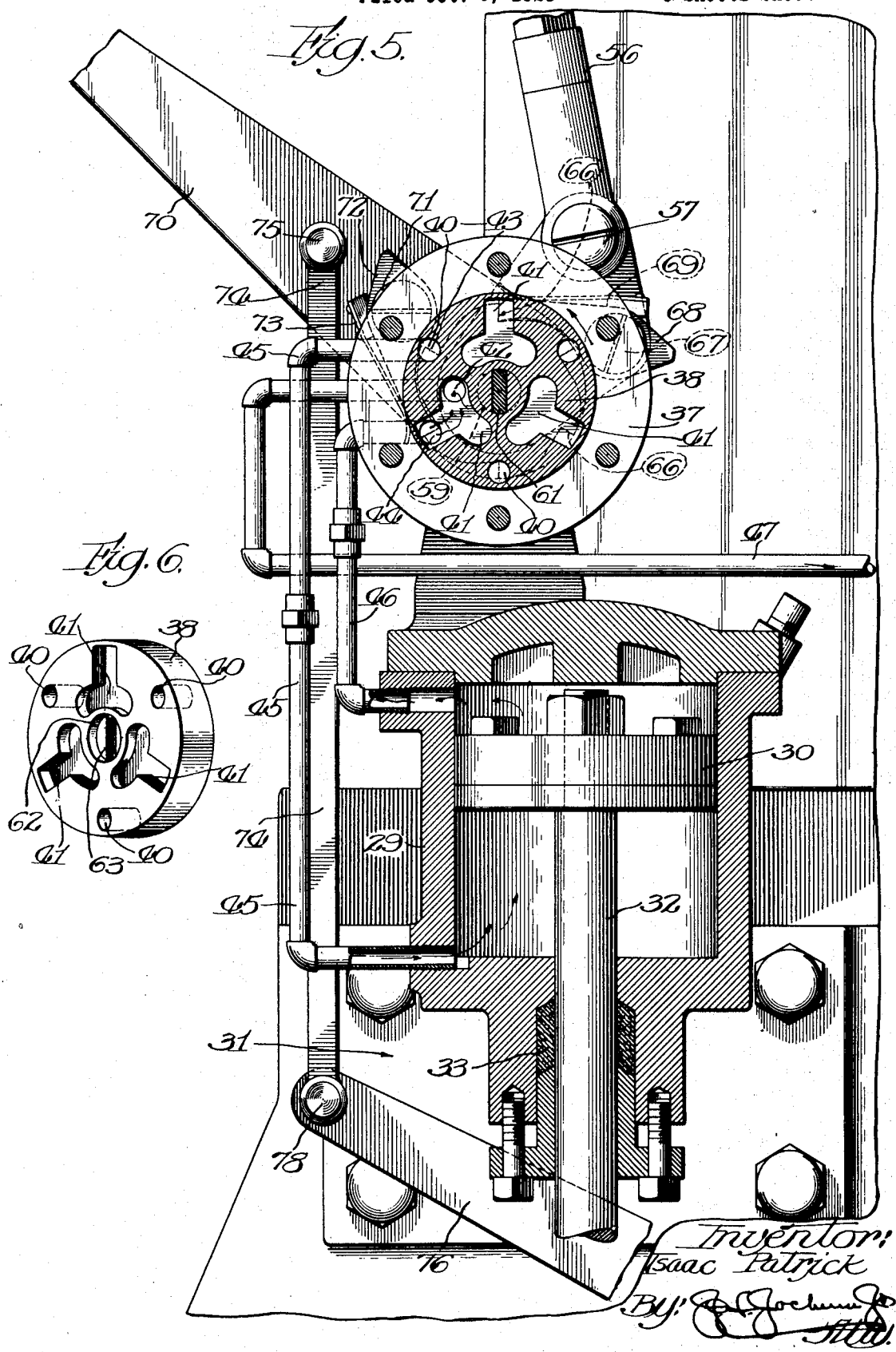

Jan. 14, 1930. I. PATRICK 1,743,476
FLUID ACTUATED CONTROL FOR CLUTCHES
Filed Oct. 5, 1928 6 Sheets-Sheet 6
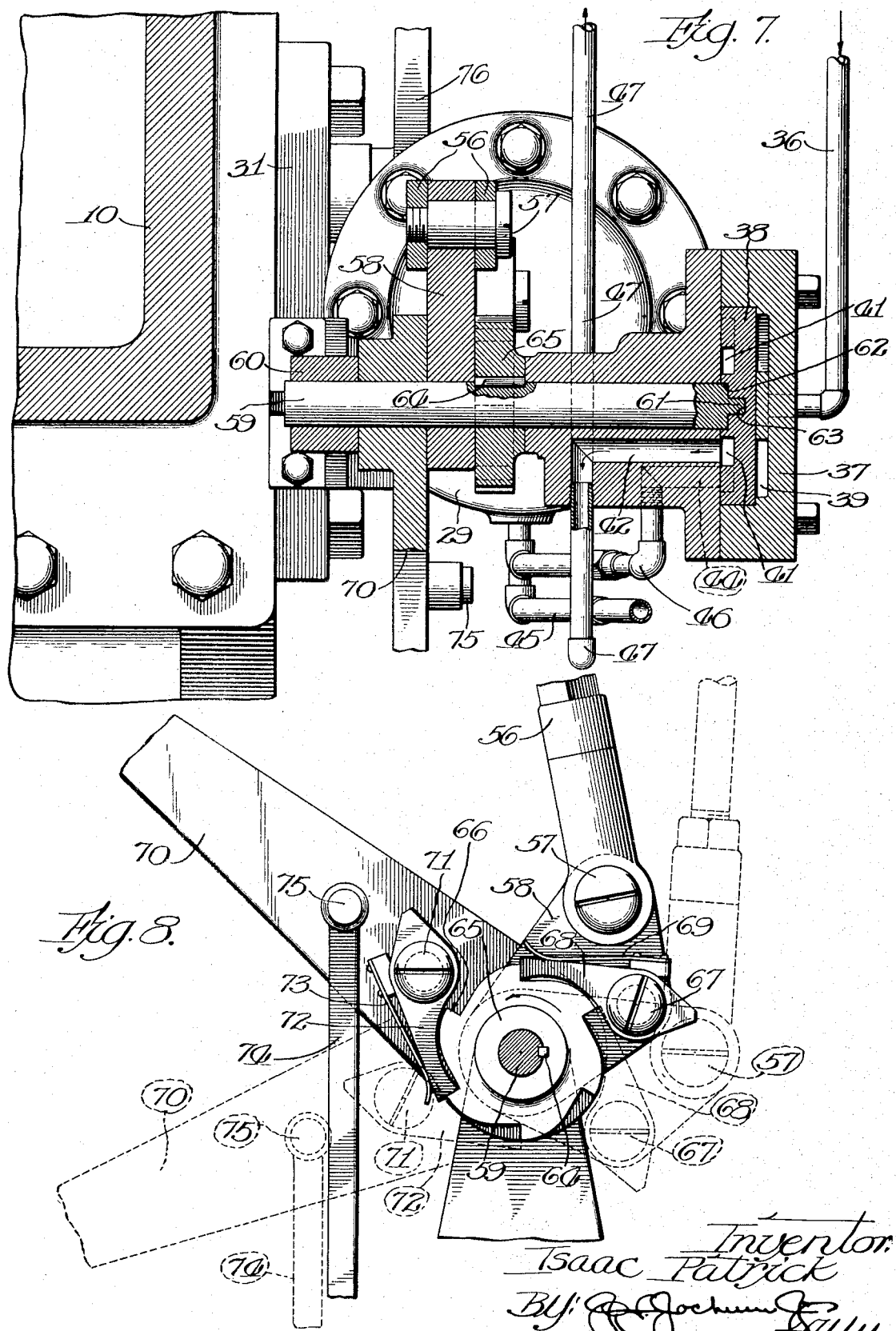

Patented Jan. 14, 1930

1,743,476

UNITED STATES PATENT OFFICE

ISAAC PATRICK, OF ROCKFORD, ILLINOIS, ASSIGNOR TO MARQUETTE TOOL & MFG. COMPANY, OF CHICAGO, ILLINOIS, A CORPORATION OF ILLINOIS

FLUID-ACTUATED CONTROL FOR CLUTCHES

Refiled for abandoned application Serial No. 215,568, filed August 26, 1927. This application filed October 5, 1928. Serial No. 312,118.

This application is a continuation of my application, Serial Number 215,568, filed August 26, 1927.

This invention relates in general to improvements in controlling mechanism for controlling the operation of a clutch, and one of the objects of the invention is to provide an improved fluid operated attachment of this character, particularly adapted though not necessarily limited in its use for sheet metal working machines for controlling the operation of the machine by shifting the clutch to render the same active and inactive at predetermined times in the cycle of operation of the press or at the will of the operator.

A further object is to provide an improved fluid actuated attachment of this character which itself is controlled by the operation of a foot treadle whereby to start the press all that is necessary is to depress the treadle. Should the operator neglect to remove his foot from the treadle the press will automatically stop at the top of the stroke. If for any reason it is necessary to stop the press before the cycle of operation thereof is completed, this can be done by again depressing the foot treadle which will stop the press.

That is to say, by the use of this improved attachment the press may be started or stopped by simply depressing the foot treadle and should the operator neglect to remove his foot from the treadle, the press will automatically stop when the stroke is completed.

A further object is to provide an improved attachment of this character which will be simple and compact in construction, inexpensive to manufacture, effective and efficient in operation and adapted to be readily applied to a press.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which.

Figure 3 is an enlarged detail view of the attachment, partly in elevation, partly in section and partly broken away, showing a portion of the frame of the press and with the parts in the position they will assume when the clutch is inactive.

Figure 4 is a view taken on line 4—4, Figure 3.

Figure 5 is an enlarged view partly in elevation, partly in section and partly broken away, showing the parts of the attachment in the positions they will assume when the clutch is active.

Figure 6 is a detail perspective views of the controlling valve.

Figure 7 is a detail, horizontal sectional view taken on line 7—7, Figure 3.

Figure 8 is an enlarged detail view, partly in elevation, partly in section and partly broken away, of the operating mechanism for shifting or actuating the controlling valve.

Figure 1:
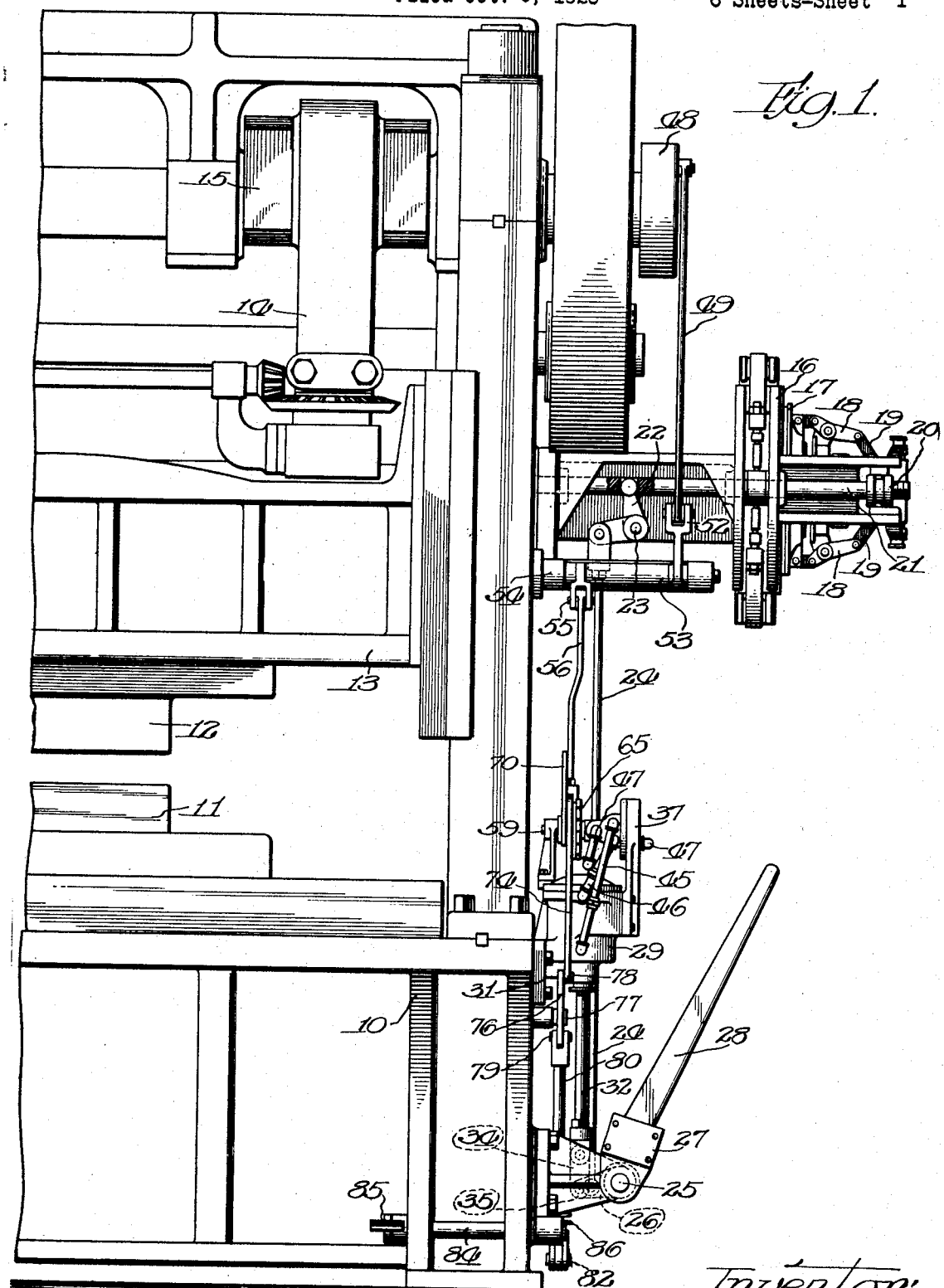
Figure 1 is a view partly in front elevation, partly in section and with parts omitted, taken from the front of a press having an attachment constructed in accordance with the principles of this invention applied thereto, showing the clutch out or inactive.
Figure 2:
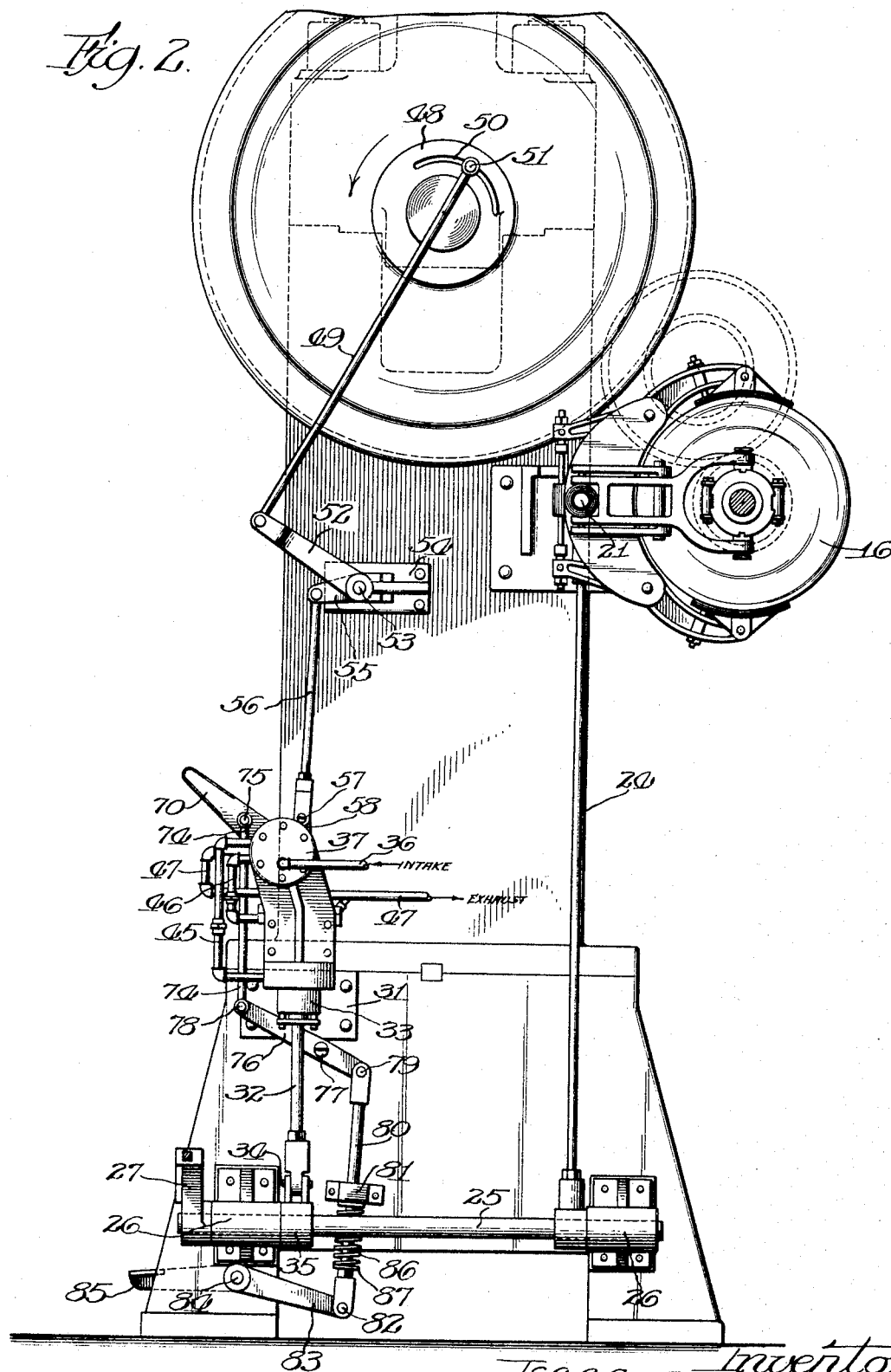
Figure 2 is a side elevation of Figure 1.

Referring more particularly to the drawings the numeral 10 designates generally the supporting structure of a press upon the base of which is mounted a die 11, with which a die 12 co-operates. The die 12 is connected with a reciprocating ram 13, which latter in turn is connected through the medium of suitable links 14 with a crank shaft 15 which receives its motion from any suitable source (not shown).

The press is adapted to be rendered active and inactive with respect to the source of power by means of a suitable clutch embodying a member 16, with which a clutch member 17 co-operates. The clutch member 17 is adapted to be shifted with respect to the member 16 by means of suitable bell crank levers 18, which in turn are connected by means of links 19 with a member 20, the latter being connected to a rod 21 that is adapted to be shifted lengthwise thereof by means of a bell crank lever 22 pivotally mounted as at 23, one end of the bell crank lever being connected with the bar or rod 21, and to the other end is connected a rod 24, which in turn is connected to a rock shaft 25 journaled in suitable bearings 26.

A socket 27 is connected with the rock shaft 25, and into this socket one end of a hand lever 28 is adapted to be inserted so that the rock shaft can be moved to shift the bar or rod 21 manually to render the clutch active and inactive.

All of the above referred to parts, however, are of the ordinary and well known construction and constitute no portion of the present invention.

Mounted upon a suitable portion of the machine is a cylinder 29 in which a piston 30 is adapted to reciprocate.

The cylinder 29 is supported by means of a suitable bracket 31 and is arranged at any desired elevation above the shaft 25.

Connected with the piston 30 is a piston rod 32 which passes through a suitable stuffing box 33 and the free end of the piston rod is connected by means of a suitable link 34 (see particularly Figure 3) with an arm 35 connected with the rock shaft 25 so that when the piston is moved downwardly in the cylinder 29 the shaft 25 will be rocked in one direction so as to pull upon the rod 24 to shift the rod or member 21 in one direction, and when the piston 30 moves in the opposite direction in the cylinder the rock shaft 25 will be rocked in the opposite direction to correspondingly shift the rod or member 21 to control the clutch.

The piston 30 is adapted to be reciprocated in the cylinder 29 by fluid pressure supplied from any suitable source through a supply pipe 36 (see particularly Figures 3 and 7), the pipe 36 being connected by one end with a casing 37 in which a valve 38 is adapted to be oscillated. The casing 37 is provided with a port or passage 39 with which the supply pipe or conduit 36 has constant communication and the valve 38 is provided with a plurality of ports 40 passing entirely therethrough and which ports are adapted to be successively brought into register or communication with the passage 39 so as to permit fluid to pass from the pipe 36 and through the valve 38.

The valve 38 is also provided with passages 41 opening through one face thereof and arranged intermediate the ports 40.

The valve casing 37 on the same side of the valve 38 as the passages 41 are located, is provided with an exhaust outlet 42 and two additional passages 43–44. Connected with the passage 43 is a pipe 45 which leads to the cylinder 29 and has communication therewith on the bottom side of the piston 30.

Connected with the port 44 is a pipe 46 which has communication with the cylinder 29 on the upper side of the piston 30.

Connected with the port 42 is a pipe 47, which latter constitutes an exhaust pipe.

The passages 41 are adapted to alternately connect the passages 43 and 44 with the exhaust port 42 which communicates with the pipe 47 so as to permit the fluid on the respective sides of the piston 30 to be alternately exhausted therefrom to permit the piston to move in the opposite direction. The ports 40 are adapted, when the valve 38 is rotated, to successively establish communication between the inlet supply pipe 36 and passage 37 with the ports 43 and 44 so that the incoming fluid which is entering under pressure will be delivered to either the top or bottom side of the piston 30 according to which of the ports 43 or 44 is in register or communication with the port 40.

Therefore, it will be manifest that by rotating the valve 38 so as to alternately direct the fluid to the top and bottom side of the piston and alternately exhaust the fluid therefrom, the piston 30 will be caused to be moved in a corresponding direction in the cylinder 29. When the fluid is admitted to the top side of the piston 30 it is exhausted from the bottom side and as the piston 30 moves downwardly it will lower the piston rod 32 and this will, through the medium of the link 34 and arm 35 rock the shaft 25 to shift the rod or member 21 through the medium of the rod 24 and bell crank lever 23 to render the clutch members 16 and 17 inactive and thereby stop the operation of the press.

When the fluid is admitted to the cylinder on the bottom side of the piston 30 and exhausted from the top side thereof the piston will rise and the rock shaft 25 will be rocked in the opposite direction to render the clutch members 16 and 17 active with respect to each other.

Any suitable means may be provided for rotating the valve 38 so as to position the same so that the clutch members 16 and 17 will be controlled at a predetermined time in the cycle of operation of the press, to stop the press.

Mechanical means are also provided which may be actuated at the will of the operator to stop the press whenever desired, and which mechanical means will also serve to rotate the valve 38. These two valve operating means are so arranged that the operation of one will not interfere with the operation of the other.

Connected with the crank shaft 15 of the press is a disc 48, with which a rod 49 is adjustably connected by one end preferably through the medium of a slot and bolt connection 50—51, which renders it possible to adjust the connection whenever desired.

This rod 49 is connected by its other end to an arm 52 that is connected with a rock shaft 53 journaled in a suitable bearing 54.

Connected to the rock shaft 53 is an arm 55 and connected to this arm 55 is one end of a bar or link 56. To the other end of the bar 56 is pivotally connected as at 57 a member 58 which is loosely mounted upon a shaft 59.

The shaft 59 is journaled in a suitable bearing 60 and also in one of the walls of the valve casing 37. One extremity of the shaft 59 terminates adjacent the valve 38 and is reduced as at 61 to form a projection which is angular in cross section. The extremity of the shaft on which the projection 61 is formed enters a seat 62 in the adjacent face of the valve 38 and communicating with this seat 62 is a recess 63 which is angular in cross section to receive the angular projection 61 on the shaft 59 so that when the shaft is rotated the valve 38 will be correspondingly rotated. At the same time this connection between the shaft 59 and the valve 38 serves as a means whereby the valve may be readily detached from the shaft when desired.

Connected with the shaft 59 for rotation therewith, such as by means of a key or feather 64, is a ratchet wheel 65 having ratchet teeth 66. Pivotally mounted upon the member 58 as at 67 is a pawl 68, the end of which co-operates with the ratchet teeth 66, and a spring 69 operates upon the pawl 68, and tends normally to hold the same against the periphery of the ratchet wheel. As the member 58 is oscillated by the shaft 59 by the reciprocation of the rod or link 56, the pawl 68 will, when the member 58 is lowered from the position shown in full lines in Figure 8 to the position shown in dotted lines, ride over the ratchet teeth 66. When the member 58 is raised from the position shown in dotted lines to the full line position in Figure 8, the end of the pawl 68 will engage behind one of the ratchet teeth 66 to impart one step of rotation to the ratchet wheel 65, shaft 59 and valve 38.

The rod 49 is connected with the disc 48 in such a manner that when the ram of the press approaches the end of its upward movement, the ratchet wheel 65 will impart one step of rotation to the valve 38 to render the clutch inactive. It is during the lowering movement of the ram that the pawl 68 is positioned by the movement of the member 58 so as to impart another step of rotation to the valve 38 when the ram is reaching the limit of its upward movement.

It will therefore be manifest that upon the completion of each cycle of operation of the press fluid will be admitted to the cylinder on the top side of the piston 30 so as to depress the piston and rock the shaft 25 to render the clutch inactive. At the same time the fluid will be exhausted from the cylinder on the bottom side of the piston through the pipe 45, port 43, passage 41 in the valve 38, exhaust passage 42 and exhaust pipe 47.

When the valve 38 is positioned to admit fluid to the top side of the piston 30, as shown in Figure 3 of the drawings, the pipe 45 which leads from the bottom side of the piston will be opened by reason of the port 43 being brought into communication with the exhaust port 42 through the medium of one of the passages 41 in the valve 38.

As a means for controlling the operation of the press at the will of the operator, there is provided a lever 70 which is also loosely mounted upon the shaft 59. Pivotally mounted upon the lever 70 as at 71 is a pawl 72 which also is adapted to co-operate with the ratchet teeth 66 to engage the teeth and rotate the ratchet. A spring 73 operates upon the pawl 72 and tends normally to hold it against the periphery of the ratchet wheel.

This lever may be operated by hand by simply grasping the lever and moving it about its pivot.

Means are also provided whereby the lever may be actuated by a foot control and to that end there is provided a link 74 which is pivotally connected at one end as at 75 with the lever 70. Another lever 76 is pivotally mounted intermediate its ends as at 77 in any suitable position and to one end of the lever 76 is pivotally connected as at 78 the free end of the link 74. Connected with the other end of the lever 76 as at 79 is a rod 80 which passes through a suitable bearing 81 and is pivotally connected as at 82 to an arm 83 connected with a shaft 84, and to which shaft 84 is connected a foot treadle 85 arranged in a convenient position for the operator.

A coil spring 86 encompasses the rod 80 with one end thereof engaging the bearing 81. The other end of the spring 86 engages a collar or shoulder 87 on the rod 80 and the spring 86 tends normally to raise the foot treadle 85 and also the lever 70 but, when pressure is exerted upon the foot treadle 85 the spring 86 will be compressed to store energy therein so that when the foot is removed from the treadle 85 the spring will return the control and also the lever 70.

It will therefore be manifest that by the operation of the foot treadle 85 or the hand lever 70 the press may be stopped at any point in its cycle of operation which is due to the fact that when the lever 70 is depressed or the foot treadle 85 is depressed, the valve 38 will be rotated so as to admit fluid pressure into the cylinder 29 on the top side of the piston to depress the latter and to exhaust the fluid from the bottom side of the piston so that the downward movement of the piston in the cylinder will not be retarded. The lowering of the piston 30 in the cylinder will rock the shaft 25 and thereby render the clutch inactive.

With this improved construction it will be manifest that to start the press the operator need only press the treadle 85 and should he neglect to remove his foot from the treadle the press will automatically stop at the top of its stroke by reason of the fact that the member 58 being raised will cause the dog 68 to move the ratchet wheel 65 one step of rotation to permit the fluid to enter the cylinder on the top side of the piston and exhaust from the bottom side.

It will also be manifest that if, for any reason it is desired to stop the press before the cycle of operation is completed, this can be done by the operator depressing the foot treadle 85, which will also position the valve 38 to admit the fluid to the top side of the piston 30 and exhaust the fluid from the bottom side thereof. In other words to start or stop the press it is only necessary to depress the foot treadle and should the operator neglect to remove his foot, the press will automatically stop when the stroke is completed.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A clutch control device embodying a cylinder, a piston reciprocable therein, means responsive to the movement of the piston in the cylinder for controlling the clutch, a valve casing, ports in the casing connected respectively with the cylinder on opposite sides of the piston, an inlet port, an exhaust port, a valve in the valve casing, ports and passages in the valve, and means responsive to the operation of a movable part of the mechanism to be controlled by the clutch for actuating the valve for connecting the cylinder on one side of the piston with said inlet port and on the other side of the piston with said exhaust port.

2. A clutch control device embodying a cylinder, a piston reciprocable therein, means responsive to the movement of the piston in the cylinder for controlling the clutch, a valve casing, ports in the casing connected respectively with the cylinder on opposite sides of the piston, an inlet port, an exhaust port, a valve in the valve casing, ports and passages in the valve, means operating automatically to actuate the valve for connecting the cylinder on one side of the piston with said inlet port and on the other side of the piston with said exhaust port, and additional means for also actuating said valve at will.

3. A clutch control device embodying a cylinder and piston, means responsive to the movement of the piston in the cylinder for controlling the clutch, means embodying a valve for directing fluid pressure to one side of the piston and exhausting fluid pressure from the other side of the piston, a foot treadle, means responsive to the operation of a movable part of the mechanism to be controlled by the clutch for controlling the operation of the valve, and an operative connection between the foot treadle and the said valve for also controlling the actuation of the valve.

4. A clutch control device embodying a cylinder and piston, means responsive to the movement of the piston in the cylinder for controlling the clutch, means embodying a valve for directing fluid pressure to one side of the piston and exhausting fluid pressure from the other side of the piston, means for automatically actuating the valve, a foot treadle, and an operative connection between the foot treadle and the valve for controlling the actuation of the valve, the last said means and the said foot treadle being operable independently one with respect to the other.

5. A clutch control device embodying fluid controlled means for controlling the actuation of the clutch, means operating automatically at a predetermined time in the cycle of operation of the mechanism to which the clutch is connected for controlling the operation of the said fluid controlled means, a foot treadle, and means responsive to the operation of the said foot treadle for controlling at will the operation of said fluid controlled means, both of the said controlling means for the said fluid controlled means being operable independently of each other.

6. A clutch control device embodying fluid controlled means for controlling the actuation of the clutch, means operating automatically at a predetermined time in the cycle of operation of the mechanism to which the clutch is connected for controlling the operation of the said fluid controlled means, a foot treadle, and means responsive to the operation of the said foot treadle for controlling at will the operation of said fluid controlled means, both of the said controlling means for the said fluid controlled means being operable independently of each other, the said fluid controlled means embodying a rotary valve device having a constant direction of rotation.

7. A clutch control device embodying a cylinder, a piston reciprocable therein, a rock shaft, an operative connection between the shaft and the clutch, an operative connection between said piston and shaft, a valve casing, ports in the casing leading to the cylinder and respectively on opposite sides of the piston, a fluid supply port in the casing, an exhaust port leading from the casing, a rotary valve in the casing, ports and passages in the valve for alternately connecting the first said ports respectively with the said inlet and exhaust port, means operating automatically at a predetermined time in the cycle of operation of the mechanism to which the clutch is connected for actuating the valve to shift the fluid pressure from one to the other side of said piston, and means operable at the will of the operator for also shifting the valve.

8. A clutch control device embodying a cylinder, a piston reciprocable therein, a rock shaft, an operative connection between the shaft and the clutch, an operative connection between said piston and shaft, a valve casing, ports in the casing leading to the cylinder and respectively on opposite sides of the piston, a fluid supply port in the casing, an exhaust port leading from the casing, a rotary valve in the casing, ports and passages in the valve for alternately connecting the first said ports respectively with the said inlet and exhaust port, means operating automatically at a predetermined time in the cycle of operation of the mechanism to which the clutch is connected for actuating the valve to shift the fluid pressure from one to the other side of said piston, and means operable at the will of the operator for also shifting the valve, the last said means embodying a foot treadle, both of the said valve operating means being independently operable.

9. A clutch control device embodying a cylinder, a piston reciprocable therein, a rock shaft, an operative connection between the shaft and the clutch, an operative connection between said piston and shaft, a valve casing, ports in the casing leading to the cylinder and respectively on opposite sides of the piston, a fluid supply port in the casing, an exhaust port leading from the casing, a rotary valve in the casing, ports and passages in the valve for alternately connecting the first said ports respectively with the said inlet and exhaust port, a ratchet connected with the valve for rotating it, means embodying a pawl co-operating with the ratchet for automatically rotating the valve at a predetermined time in the cycle of operation of the mechanism to which the clutch is connected, and means embodying a pawl operable upon said ratchet at will for also actuating the valve.

10. A clutch control device embodying a cylinder, a piston reciprocable therein, a rock shaft, an operative connection between the shaft and the clutch, an operative connection between said piston and shaft, a valve casing, ports in the casing leading to the cylinder and respectively on opposite sides of the piston, a fluid supply port in the casing, an exhaust port leading from the casing, a rotary valve in the casing, ports and passages in the valve for alternately connecting the first said ports respectively with the said inlet and exhaust port, a ratchet connected with the valve for rotating it, means embodying a pawl co-operating with the ratchet for automatically rotating the valve at a predetermined time in the cycle of operation of the mechanism to which the clutch is connected, a foot treadle, and means embodying a pawl operatively connected with said foot treadle and operable upon the ratchet for rotating said valve at will.

11. A clutch control device embodying a clutch, a rock shaft for controlling the operation thereof, fluid pressure means operable upon the said shaft for rocking the same, and a plurality of separate and independently operable means for controlling the operation of the said fluid pressure means, one of the last recited means being responsive in its operation to the operation of one of the parts of the mechanism to be controlled by the clutch.

12. A clutch control device embodying a clutch, an actuating member for controlling the operation thereof, fluid pressure means operable upon the said actuating member to actuate it, manual means embodying an actuator adapted to be moved in one direction to control the operation of the fluid pressure means, and additional means operable automatically to control the fluid pressure means independently of the said manual means and while the said manual means is maintained in its said shifted position.

13. A clutch control device embodying a clutch, an actuating member for controlling the operation thereof, fluid pressure means operable upon said actuating means to actuate it, said fluid pressure means embodying a rotatable valve device having a constant direction of rotation, manual means operable upon the valve to rotate it to control the operation of said fluid pressure means, and automatically actuated means also operable upon the valve to rotate it to control the said fluid pressure means, the last recited means being adapted to operate the said valve independently with respect to and regardless of the position of the said manual means.

14. A clutch control device embodying a clutch, an actuating member for controlling the operation thereof, fluid pressure means operable upon said actuating means to actuate it, said fluid pressure means embodying a rotatable valve device having a constant direction of rotation, manual means operable upon the valve to rotate it to control the operation of said fluid pressure means, and automatically actuated means also operable upon the valve to rotate it to control the said fluid pressure means, the last recited means being adapted to operate the said valve independently with respect to and regardless of the position of the said manual means, the said manual means embodying a treadle adapted to be depressed by the operator.

15. A clutch control device embodying a clutch, an actuating member for controlling the operation thereof, fluid pressure means operable upon said actuating means to actuate it, said fluid pressure means embodying a rotatable valve device having a constant direction of rotation, manual means operable upon the valve to rotate it to control the operation of said fluid pressure means, and automatically actuated means also operable upon the valve to rotate it to control the said fluid pressure means, the last recited means being adapted to operate the said valve independently with respect to and regardless of the position of the said manual means, the said manual means embodying a foot treadle and also a hand engaging portion.

In testimony whereof I have signed my name to this specification, on this 2nd day of October, A. D. 1928.

ISAAC PATRICK.